United States Patent
Suzuki et al.

(10) Patent No.: US 7,444,985 B2
(45) Date of Patent: Nov. 4, 2008

(54) APPARATUS AND METHOD FOR CONTROLLING IGNITION TIMING OF INTERNAL COMBUSTION ENGINE

(75) Inventors: Kunihiko Suzuki, Hitachinaka (JP); Taizo Miyazaki, Hitachi (JP); Mamoru Nemoto, Hitachiota (JP)

(73) Assignee: Hitachi, Ltd., Tokyo (JP)

(*) Notice: Subject to any disclaimer, the term of this patent is extended or adjusted under 35 U.S.C. 154(b) by 10 days.

(21) Appl. No.: 11/640,233

(22) Filed: Dec. 18, 2006

(65) Prior Publication Data

US 2007/0137618 A1 Jun. 21, 2007

(30) Foreign Application Priority Data

Dec. 19, 2005 (JP) ............... 2005-364860

(51) Int. Cl.
*F02P 5/00* (2006.01)
*F02P 5/04* (2006.01)
(52) U.S. Cl. ............... 123/406.5; 123/406.46
(58) Field of Classification Search ............ 123/406.11, 123/406.47, 406.5, 406.51, 406.52, 406.24, 123/406.25, 406.26, 406.45, 406.46
See application file for complete search history.

(56) References Cited

U.S. PATENT DOCUMENTS

| | | | | |
|---|---|---|---|---|
| 4,085,714 A | * | 4/1978 | Hattori et al. | 123/406.66 |
| 4,220,125 A | * | 9/1980 | Nishida et al. | 123/406.52 |
| 4,442,813 A | * | 4/1984 | Nagase et al. | 123/406.53 |
| 4,854,285 A | * | 8/1989 | Kanno et al. | 123/406.51 |
| 4,912,642 A | * | 3/1990 | Larsen et al. | 701/99 |
| 4,913,116 A | * | 4/1990 | Katogi et al. | 123/406.32 |
| 5,168,851 A | | 12/1992 | Itoyama et al. | |
| 5,197,431 A | * | 3/1993 | Takaba et al. | 477/118 |
| RE34,316 E | * | 7/1993 | Katogi et al. | 123/406.32 |
| 5,271,367 A | * | 12/1993 | Abe | 123/406.55 |
| 5,422,811 A | * | 6/1995 | Togai | 701/105 |
| 5,503,126 A | * | 4/1996 | Sakakibara et al. | 123/406.55 |
| 5,868,115 A | * | 2/1999 | Fukui | 123/406.55 |
| 6,050,238 A | * | 4/2000 | Suzuki et al. | 123/295 |
| 6,230,697 B1 | * | 5/2001 | Itoyama et al. | 123/568.21 |
| 6,311,667 B1 | * | 11/2001 | Satou et al. | 123/295 |
| 7,322,341 B2 | * | 1/2008 | Yamaguchi et al. | 123/435 |
| 2001/0035008 A1 | * | 11/2001 | Nozawa et al. | 60/284 |
| 2002/0124831 A1 | | 9/2002 | Kondo | |
| 2003/0168036 A1 | | 9/2003 | Kustosch et al. | |

FOREIGN PATENT DOCUMENTS

| | | | |
|---|---|---|---|
| EP | 1 342 898 A2 | | 9/2003 |
| JP | 59168266 A | * | 9/1984 |
| JP | 9-209895 A | | 8/1997 |
| JP | 11-264330 A | | 9/1999 |
| JP | 2001-221105 A | | 8/2001 |
| JP | 2003-201945 A | | 7/2003 |
| WO | WO 2004/036036 A1 | | 4/2004 |

OTHER PUBLICATIONS

European Search Report dated Mar. 21, 2007 (six (6) pages).

* cited by examiner

*Primary Examiner*—Mahmoud Gimie
(74) *Attorney, Agent, or Firm*—Crowell & Moring LLP (57) ABSTRACT

A transient correction of an ignition timing is precisely executed even in a transient state. The ignition timing at a stationary time is computed on the basis of an operating state detected by an operating state detecting means, and the ignition timing at the stationary time is corrected by a transient time ignition timing correcting means defined by a transfer function G(s).

10 Claims, 6 Drawing Sheets

APPARATUS AND METHOD FOR CONTROLLING IGNITION TIMING OF INTERNAL COMBUSTION ENGINE

TECHNICAL FIELD

The present invention relates to an apparatus and method for controlling an ignition timing of an internal combustion engine, and more particularly to an ignition timing control apparatus and method for correcting an ignition timing in correspondence to a transient state of the internal combustion engine.

BACKGROUND ART

In an internal combustion engine provided with a variable valve train which can optionally change an opening characteristic of a valve, there has been conventionally executed a control of an ignition timing in correspondence to the opening characteristic of the valve.

As an ignition timing control apparatus executing this kind of ignition timing control, there is a structure which estimates an amount of a burned gas sealed within a cylinder (a combustion chamber), that is, an amount of an internal exhaust gas recirculation on the basis of an overlap period between an intake valve and an exhaust valve, and corrects an ignition timing on the basis of the amount of the internal exhaust gas recirculation (for example, patent document 1).

However, in the ignition timing control apparatus shown in the patent document 1, in the case that a difference is generated between a target valve timing and an actual valve timing at a time of switching a variable valve train or the like, there is executed an ignition timing correction which is different from an actual valve overlap period, so that it is impossible to accurately control the ignition timing.

In this regard, there is an ignition timing control apparatus which detects an actual valve timing and corrects an ignition timing on the basis of a difference between a target valve timing and an actual valve timing (for example, patent document 2).

The ignition timing control apparatus can precisely correct the ignition timing even at a time of switching the variable valve train, however, executes the correction of the ignition timing on the basis of an amount of displacement of the variable valve train timing. Accordingly, the ignition timing control apparatus can not correspond to the ignition timing control of the internal combustion engine having a variable valve train lift mechanism.

Taking this matter into consideration, as a structure for executing an ignition timing correction on the basis of a difference between a target opening timing and an actual opening timing in a transient state of a variable valve train, in an internal combustion engine provided with a variable valve train timing mechanism and a variable valve train lift mechanism, there has been proposed an ignition timing control apparatus structured such as to precisely execute an ignition timing correction even in the transient state of the internal combustion engine provided with the variable valve train timing mechanism and the variable valve train lift mechanism (for example, patent document 3).

Further, there has been proposed an internal combustion engine control apparatus which corrects a detection delay of a load detecting means by using a delay system model of an intake passage from a load detecting means to an intake valve existing in a downstream side of the load detecting means, and computing an amount of a fuel injection on the basis of a corrected amount of a filled air, at a time when an operating characteristic of a variable valve train is changed (for example, patent document 4).

Patent Document 1: JP-A-2001-221105
Patent Document 2: JP-A-9-209895
Patent Document 3: JP-A-2003-201945
Patent Document 4: JP-A-11-264330

BRIEF SUMMARY OF THE INVENTION

However, in the ignition timing control apparatus shown in the patent document 3, since the ignition timing correction at a time of a transition of the variable valve train is executed on the basis of the difference between the target valve opening timing of the actual valve opening timing, a working speed of the gas within the intake passage of the internal combustion engine becomes relatively slow in the case that a response speed of a valve opening and closing motion is sufficiently large. As a result, in spite of a necessity of executing the ignition timing transient correction in correspondence to a response of the gas within the intake passage, the difference is hardly generated between the target valve opening timing and the actual valve opening timing. Accordingly, the transient correction of the ignition timing is not executed.

Further, it is necessary to consider not only an influence of the transient amount of the filled air but also an influence of a transient exhaust gas recirculation amount, a flow and the like for the ignition timing control, however, the ignition timing correction in the transient state of the variable valve train can not be precisely executed even by applying the internal combustion engine control apparatus as shown in the patent document 4 to the ignition timing control apparatus.

The present invention is made by taking the problem mentioned above into consideration, and an object of the present invention is to provide an apparatus and method for controlling an ignition timing of an internal combustion engine provided with a means for detecting an operating state, and an intake and exhaust flow rate control means or an intake flow control means, in which it is possible to precisely execute a transient control of an ignition timing even in a transient state in which a time change amount of an engine speed, a load of an operating characteristic of any one of the intake and exhaust flow rate control means and the intake flow control means of the internal combustion engine is equal to or more than a predetermined value.

In order to achieve the object mentioned above, in accordance with the present invention, there is provided an ignition timing control apparatus of an internal combustion engine comprising:

an operating state detecting means for detecting an operating state of the internal combustion engine;

a stationary time ignition timing computing means for computing an ignition timing at a stationary time on the basis of an operating state detected by the operating state detecting means; and a transient time ignition timing correcting means for computing a transient time ignition timing by applying a transient correction defined by a transfer function on the basis of the operating state detected by the operating state detecting means to the stationary time ignition timing computed by the stationary time ignition timing computing means.

In preferable, the ignition timing control apparatus of the internal combustion engine in accordance with the present invention executes the transient correction of the ignition timing by the transient time ignition timing correcting means defined by the transfer function, at a time when a time change amount of an engine speed, a load or an operating characteristic of any one of the intake and exhaust flow rate control means and the intake flow control means of the internal combustion engine is equal to or more than a predetermined value.

In preferable, the ignition timing control apparatus of the internal combustion engine in accordance with the present invention is structured such that the transfer function is defined by a function on the basis of a secondary delay system element, the transfer function on the basis of the secondary delay system element is provided with any one of a natural frequency, a damping constant and a gain constant, and the operating state detecting means is provided with a means for detecting at least one of an engine speed, a load and an operating characteristic of the intake and exhaust flow rate control means or the intake flow control means of the internal combustion engine, and has a means for determining the natural frequency, the damping constant and the gain constant on the basis of any one of the engine speed, the load and the operating characteristic of the intake and exhaust flow rate control means or the intake flow control means detected by the operating state detecting means.

In preferable, the ignition timing control apparatus of the internal combustion engine in accordance with the present invention is structured such that the natural frequency, the damping constant and the gain constant are determined on the basis of a numerical simulation apparatus simulating the internal combustion engine.

In preferable, the ignition timing control apparatus of the internal combustion engine in accordance with the present invention is structured such that the transfer function is defined by a function on the basis of a primary delay system element, a transfer function on the basis of the primary delay system element is provided with any one of a time constant and a gain constant, and the operating state detecting means is provided with a means for detecting at least one of an engine speed, a load and an operating characteristic of the intake and exhaust flow rate control means of the intake flow control means of the internal combustion engine, and has a means for determining the time constant and the gain constant on the basis of any one of the engine speed, the load and the operating characteristic of the intake and exhaust flow rate control means or the intake flow control means detected by the operating state detecting means.

In preferable, the ignition timing control apparatus of the internal combustion engine in accordance with the present invention is structured such that the time constant and the gain constant are determined on the basis of a numerical simulation apparatus simulating the internal combustion engine.

In preferable, the ignition timing control apparatus of the internal combustion engine in accordance with the present invention is structured such that the intake and exhaust flow rate control means is constituted by a variable valve train capable of optionally changing an opening characteristic of an intake or exhaust valve.

In preferable, the ignition timing control apparatus of the internal combustion engine in accordance with the present invention is structured such that the intake and exhaust flow rate control means is constituted by an external exhaust gas recirculation valve provided in a passage recirculating a burned gas from an exhaust pipe to an intake pipe.

In preferable, the ignition timing control apparatus of the internal combustion engine in accordance with the present invention is structured such that the intake and exhaust flow rate control means is constituted by a variable intake pipe length capable of changing a length of an intake passage.

In preferable, the ignition timing control apparatus of the internal combustion engine in accordance with the present invention is structured such that the intake flow control means is constituted by a swirl control valve or a tumble control valve capable of shielding a part or an entire of an intake passage.

In order to achieve the object mentioned above, in accordance with the present invention, there is provided an ignition timing control method of an internal combustion engine comprising the steps of:

computing an ignition timing at a stationary time on the basis of an operating state of the internal combustion engine; and computing a transient time ignition timing by applying a transient correction defined by a transfer function to the ignition timing at the stationary time.

In accordance with the ignition timing control apparatus of the internal combustion engine on the basis of the present invention, since the transient time ignition timing is computed by applying the transient correction defined by the transfer function to the ignition timing at the stationary time, it is possible to precisely control the ignition timing even at the transient time of the internal combustion engine.

Other objects, features and advantages of the invention will become apparent from the following description of the embodiments of the invention taken in conjunction with the accompanying drawings.

DETAILED DESCRIPTION OF THE INVENTION

A description will be given of an embodiment of an ignition timing control apparatus of an internal combustion engine in accordance with the present invention with reference to the accompanying drawings.

Figure 1:
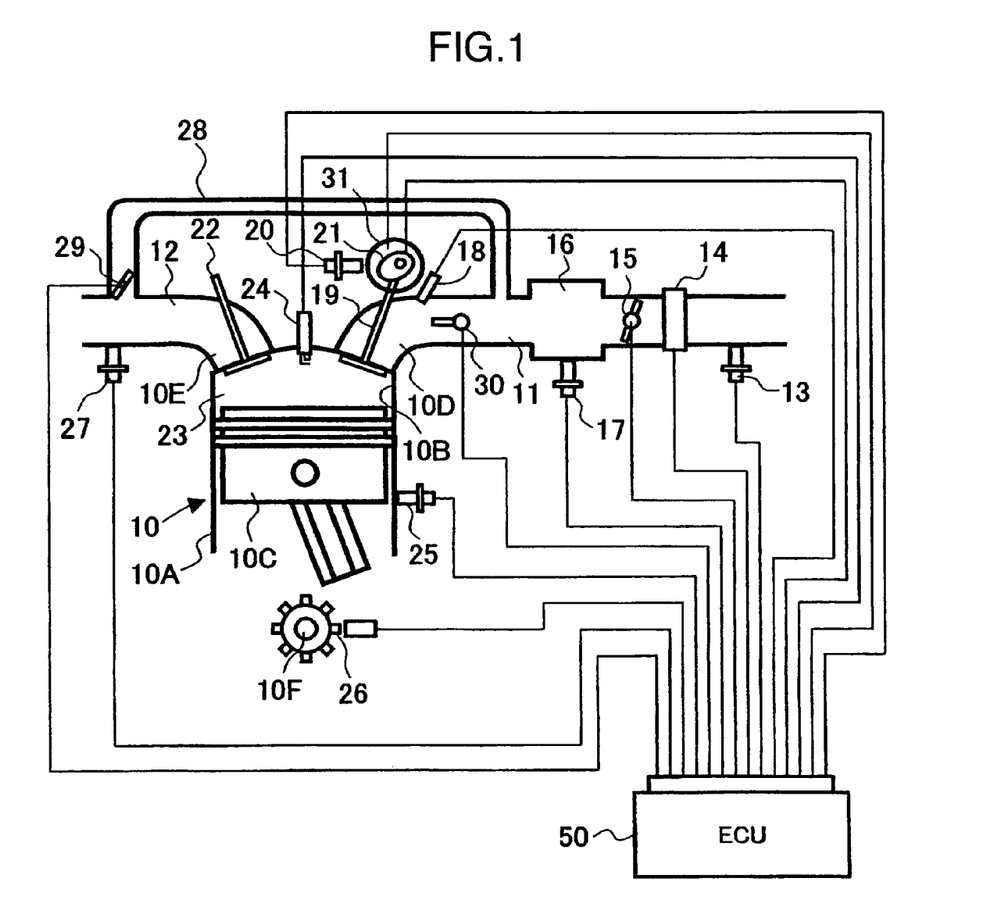
FIG. 1 is a view showing a structure of an internal combustion engine to which an ignition timing control apparatus in accordance with the present invention is applied.

FIG. 1 shows a structure of an internal combustion engine to which the ignition timing control apparatus in accordance with the present invention is applied.

An internal combustion engine 10 has a piston 10C in a cylinder bore 10B formed in a cylinder block 10A so as to freely oscillate, and defines a combustion chamber 23 in an upper side of the piston 10C. An intake flow path 11 and an exhaust flow path 12 are connected to the internal combustion engine 10 in a communicating manner.

An intake temperature sensor 13 is assembled in the intake flow path 11. An air flow sensor 14 is assembled in a downstream side of the intake temperature sensor 13. A throttle valve 15 is provided in a downstream side of the air flow sensor 14. The throttle valve 15 is constituted by an electronic controlled throttle valve which can control a throttle opening degree independently from an accelerator stepping amount. A surge tank 16 is communicated with a downstream side of the throttle valve 15. An intake pipe internal pressure sensor 17 is assembled in the surge tank 16. A fuel injection valve 18 injecting a fuel toward an intake port 10C is arranged in a downstream side of the surge tank 16.

The internal combustion engine 10 has an intake valve 19 opening and closing an intake port 10D, and an exhaust valve 22 opening and closing an exhaust port 10E.

The intake valve 19 is structured as an intake valve with a variable valve train mechanism having a variable valve train mechanism 31. The variable valve train mechanism 31 is provided with a variable valve train timing mechanism and a variable valve train lift mechanism, and variably sets a valve timing and a valve lift. In the variable valve train mechanism 31, there are assembled a timing sensor 20 for detecting the valve timing, and a lift sensor 21 for detecting the valve lift.

An ignition plug 24 in which an electrode portion is exposed to an inner side of the combustion chamber 23 is attached to the cylinder block 10A. A knock sensor 25 detecting a knock generation is attached to the cylinder block 10A. A crank angle sensor 26 is assembled in a crank shaft 10F of the internal combustion engine 10.

An A/F sensor 27 is attached to the exhaust flow path 12. An exhaust gas recirculation pipe 28 for recirculating an exhaust gas to the intake flow path 11 from the exhaust flow path 12 is connected to the exhaust flow path 12. An exhaust gas recirculation valve 29 for regulating an amount of the exhaust gas recirculation is arranged in a flow path of the exhaust gas recirculation pipe 28.

The intake flow path 11 is provided with a tumble control valve 30 for forming a tumble flow in the gas within the combustion chamber 23.

A system in accordance with the present embodiment is provided with an electronic control unit (ECU) 50, as shown in FIG. 1. The electronic control unit 50 is constituted by a computer type, is connected to various sensors mentioned above, and controls actuators such as the throttle valve 15, the fuel injection valve 18, the intake valve 19 with the variable valve train mechanism, the exhaust gas recirculation valve 29, the tumble control valve 30 and the like.

The electronic control unit 50 further detects an operating state of the internal combustion engine 10 on the basis of a signal input from the various sensors mentioned above, determines an ignition timing (a timing) in correspondence to the operating state, and controls an ignition timing by the ignition plug 24.

Figure 2:
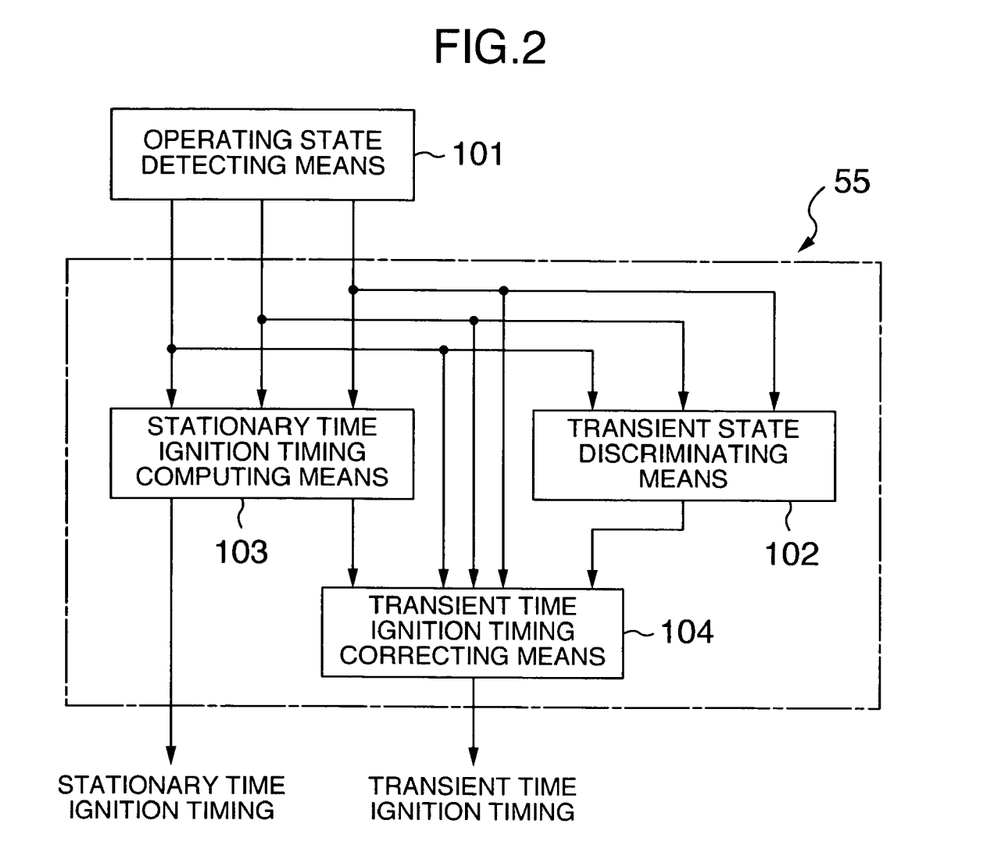
FIG. 2 is a block diagram showing an embodiment of the ignition timing control apparatus of the internal combustion engine in accordance with the present invention.

FIG. 2 shows an embodiment of an ignition timing control apparatus 55 by the electronic control unit 50.

The ignition timing control apparatus 55 is structured such as to input an information indicating the operating state of the internal combustion engine 10 from the operating state detecting means 101 and output an ignition timing instruction signal to the ignition plug 24, and has a transient state judging means 102, a stationary time ignition timing computing means 103, and a transient time ignition timing correcting means 104.

As the operating state of the internal combustion engine 10 detected by the operating state detecting means 101, there can be listed up an engine speed of the internal combustion engine 10 determined on the basis of a rectangular wave frequency output from the crank angle sensor 26, an engine load estimated on the basis of a filling amount of an intake air per one cycle determined on the basis of an output from the air flow sensor 14 provided in the intake passage 11, an engine load estimated on the basis of an output from the intake pipe internal pressure sensor 17 provided in the surge tank 16, an opening degree of the throttle valve 15, an opening characteristic of the variable intake valve 19 determined on the basis of the outputs of the timing sensor 20 and the lift sensor 21, an external exhaust gas recirculation rate estimated on the basis of an opening degree of the exhaust gas recirculation valve 29 arranged in the exhaust gas recirculation pipe 28, an opening degree of the tumble control valve 30 and the like.

The transient state judging means 102 inputs an information indicating the operating state of the internal combustion engine 10 by the operating state detecting means 101, and regards a state in which the change amount per unit time of the operating state detected by the operating state detecting means 101 becomes equal to or more than a predetermined value as the transient state.

The stationary time ignition timing computing means 103 computes the ignition timing at the stationary time on the basis of the operating state of the internal combustion engine 10 detected by the operating state detecting means 101.

The stationary time ignition timing computing means 103 has a multidimensional ignition timing map in which each of the operating states of the internal combustion engine 10 is set to an independent variable (an explaining variable), and an optimum ignition timing corresponding to the operating state of the internal combustion engine 10 is set to a dependent variable (an object variable), and sets the ignition timing at the stationary time corresponding to the operating state by referring to the ignition timing map. In this case, the ignition timing at the stationary time may be computed by using a regression model approaching the ignition timing map by a polygenetic higher-order polynominal expression.

The transient time ignition timing correcting means 104 is started in the case that the operating state of the internal combustion engine 10 is discriminated as the transient state by the transient state judging means 102, and applies the transient correction to the ignition timing at the stationary time computed by the stationary time ignition timing computing means 103 in correspondence to the operating state of the internal combustion engine 10 detected by the operating state detecting means 101.

In the case that the operating state of the internal combustion engine 10 is discriminated as the stationary state by the transient state judging means 102, an ignition timing instruction signal on the basis of the ignition timing set by the stationary time ignition timing computing means 103 is output to the ignition plug 24.

On the contrary, in the case that the operating state of the internal combustion engine 10 is discriminated as the transient state by the transient state judging means 102, the transient correction of the ignition timing is applied by the transient time ignition timing correcting means 104, and the ignition timing instruction signal on the basis of the transient corrected ignition timing is output to the ignition plug 24.

Figure 3:
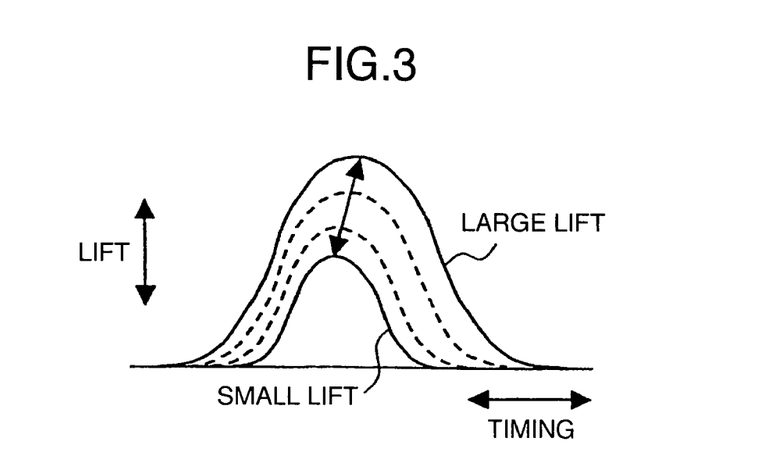
FIG. 3 is a view showing an opening characteristic of a variable intake valve provided with a variable valve train timing mechanism and a variable valve train lift mechanism.

FIG. 3 shows a lift characteristic and an opening characteristic of the variable intake valve provided with the variable valve train timing mechanism and the variable valve train lift mechanism.

In the internal combustion engine, there is a structure in which the control of the filling rate of the intake air to the combustion chamber 23 is achieved by changing the opening characteristic of the intake valve 19 as shown in FIG. 3, in place of the throttle valve 15.

In the case of increasing the filling rate of the intake air, the valve lift is controlled to an increased side by the variable valve train lift mechanism included by the variable valve train mechanism 31. In the case of decreasing the filling rate of the intake air, the valve lift is controlled to a decreased side By the variable valve train lift mechanism.

As shown in FIG. 3, it is possible to control the opening timing of the intake valve 19 and simultaneously control the amount of the burned gas remaining within the combustion chamber 23 by changing an operating angle from the opening timing of the intake valve to the closing timing by the variable valve train timing mechanism included by the variable valve train mechanism 31 at the same time of changing the lift.

As mentioned above, since the control of the filling rate of the intake air is achieved by variably changing the opening characteristic of the intake valve 19 as mentioned above, there can be obtained an advantage that a torque response is improved and a specific fuel consumption is reduced, in comparison with a case that the control of the filling rate of the intake air is achieved by the throttle valve 15. In this case, the opening degree of the throttle valve 15 is controlled for supplying the external exhaust gas recirculation in such a manner that the pressure within the surge tank 16 comes to a value slightly lower than the atmospheric pressure.

Figure 4:
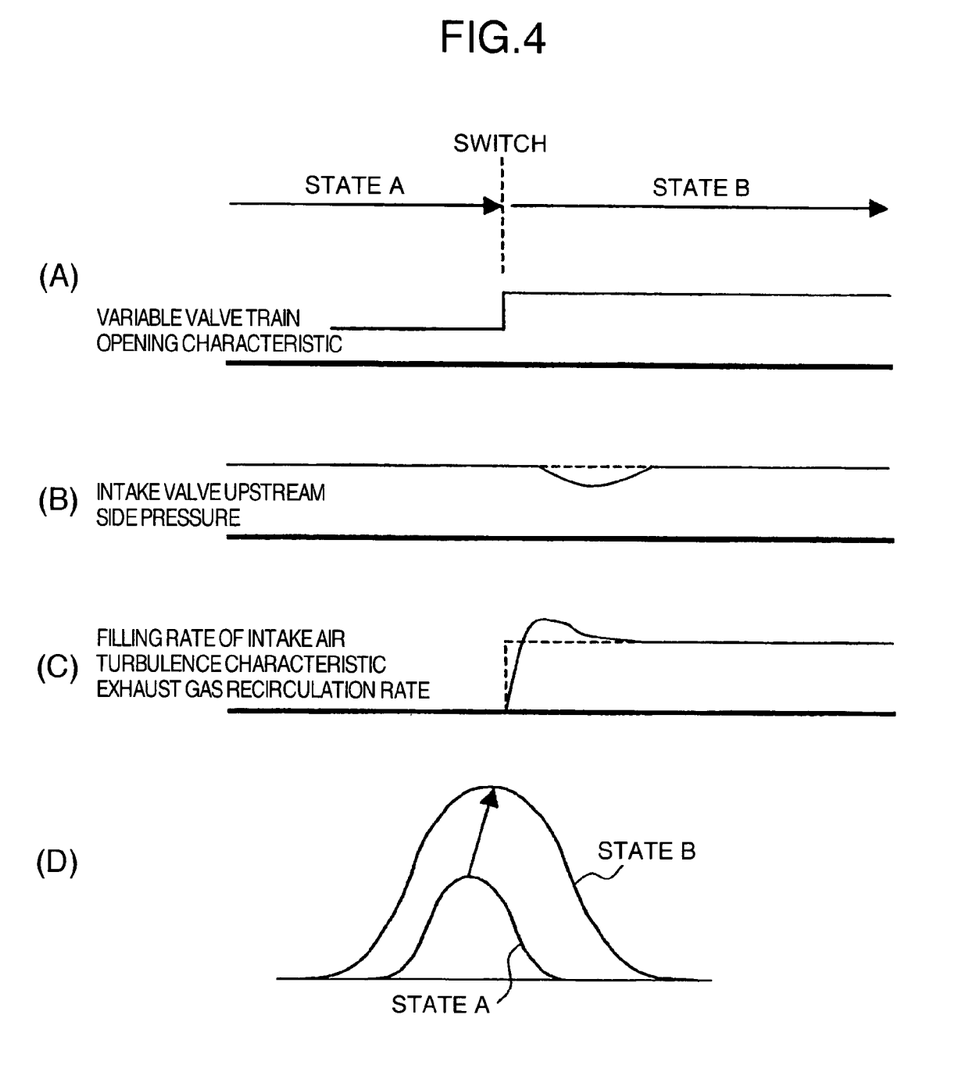
FIGS. 4A-4D are views showing a time change of a pressure of an intake pipe and a filling rate of an intake air supplied into a combustion chamber.

FIG. 4 shows a time change of the pressure of the intake pipe and the filling rate of the intake air supplied into the combustion chamber, at a time of switching the opening characteristic of the variable intake valve provided with the variable valve train timing mechanism and the variable valve train lift mechanism described in FIG. 3.

If the engine demand torque is increased at a certain instant, the filling rate of the intake air for achieving the engine demand torque is computed, and the intake valve lift for achieving the filling rate of the intake air mentioned above is estimated. Further, the valve lift of the intake valve 19 is switched to a state B (refer to FIG. 4D) from a state A (refer to FIG. 4D), as shown in FIG. 4A, by setting the estimated intake valve lift as a target value. At the same time, the opening degree of the throttle valve is switched so as to control the pressure within the surge tank to a predetermined pressure.

A response of the filling rate of the intake air is improved by changing the opening characteristic of the intake valve 19 so as to execute the control of the filling rate of the intake air, and an air amount achieving the target filling rate is taken into the combustion chamber 23 in a moment of time together with the switch of the variable valve train.

With regard to this, the upstream side pressure of the intake valve is controlled by the opening degree of the throttle valve, however, since the throttle valve 15 is provided in the upstream side of the surge tank 16, a delay is generated in comparison with the response of the intake air filling rate control by the variable valve train.

Accordingly, in the case of changing the opening characteristic of the variable valve train in a moment of time, there is a case that a pressure pulsation is generated within the intake pipe, as shown in FIG. 4B. In this case, there is a case that the filling rate of the intake air into the combustion chamber 23 indicates the transient state of the secondary delay system, as shown in FIG. 4C. Since the filling rage of the intake air greatly affects a turbulence characteristic within the combustion chamber 23 and an exhaust gas recirculation rate, the transient state of the secondary delay system is indicated in the turbulence characteristic within the combustion chamber 23 and the exhaust gas recirculation rate.

In order to execute the transient control of the optimum ignition timing while taking the influence mentioned above into consideration, it is necessary to execute the transition correction defined by a transfer function G(s) based on the secondary delay system element with respect to the stationary time ignition timing. The transfer function G(s) corresponds to a function mathematically expressing a dynamic characteristic of the secondary delay system element.

Figure 5:
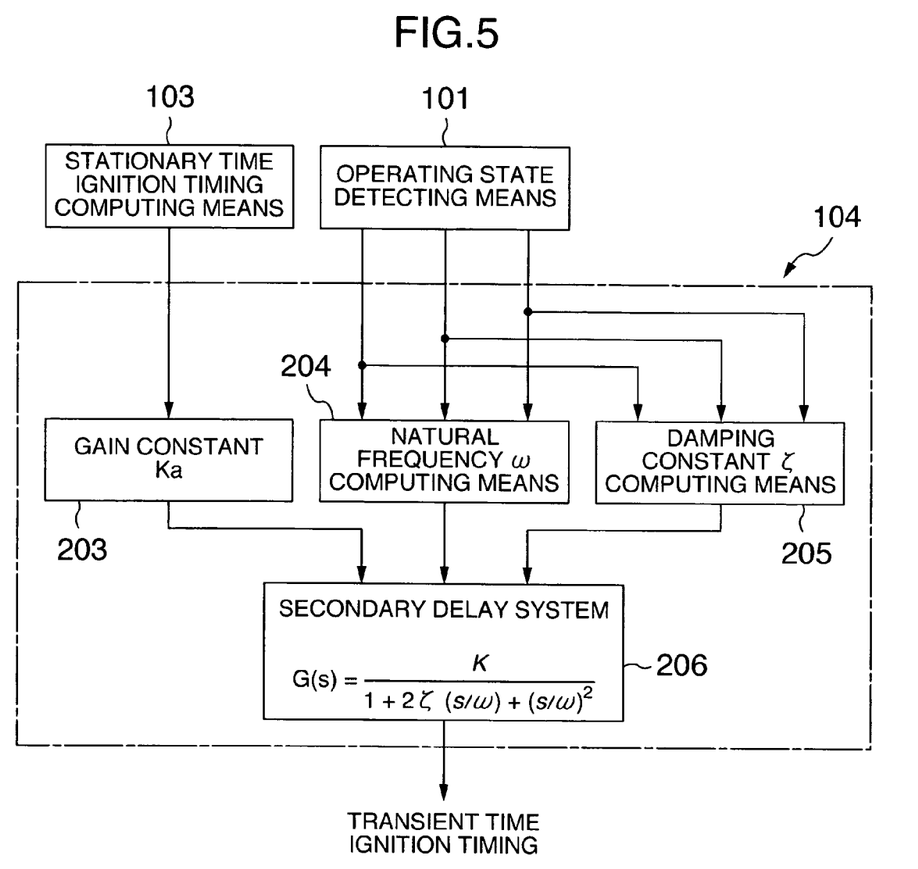
FIG. 5 is a block diagram in detail showing an embodiment of a transient time ignition timing correcting means on the basis of a secondary delay system element.

FIG. 5 shows an embodiment in which the transient time ignition timing correcting means 104 of the ignition timing control apparatus 55 shown in FIG. 2 is structured as a correcting means for executing the transient correction on the basis of the secondary delay system element.

The transient time ignition timing correcting means 104 has a gain setting device 203, a natural frequency computing means 204, a damping constant computing means 205 and a secondary delay system transient time ignition timing computing means 206.

The gain setting device 203 inputs the stationary time ignition timing signal from the stationary time ignition timing computing means 103, and sets a gain constant Ka characterizing the transient correction of the ignition timing.

The natural frequency computing means 204 computes a natural frequency ω characterizing the transient correction of the ignition timing on the basis of the operating state of the internal combustion engine 10 detected by the operating state detecting means 101. A relation between the natural frequency ω and the operating state of the internal combustion engine 10 is stored as a map or a regression model approaching the map, in the natural frequency computing means 204, and the natural frequency ω corresponding to the engine operating state is determined on the basis of the map or the regression model.

The damping constant computing means 205 computes a damping constant ζ characterizing the transient correction of the ignition timing on the basis of the operating state of the internal combustion engine 10 detected by the operating state detecting means 101. A relation between the damping constant ζ and the operating state of the internal combustion engine 10 is stored as a map or a regression model approaching the map, in the damping constant computing means 205, and the damping constant ζ corresponding to the engine operating state is determined on the basis of the map or the regression model.

The secondary delay system transient time ignition timing computing means 206 defines a transfer function G(s) based on the secondary delay system element characterized by the gain constant Ka from the gain setting device 203, the natural frequency ω from the natural frequency computing means 204, and the damping constant ζ from the damping constant computing means 205 as follows.

$$G(s)=Ka/\{1+2\zeta(s/\omega)+(s/\omega)^2\}$$

The secondary delay system transient time ignition timing computing means 206 applies the transient correction of the ignition timing by the transfer function G(s) based on the secondary delay system element defined as mentioned above, and outputs the transient time ignition timing instruction signal.

Figure 6:
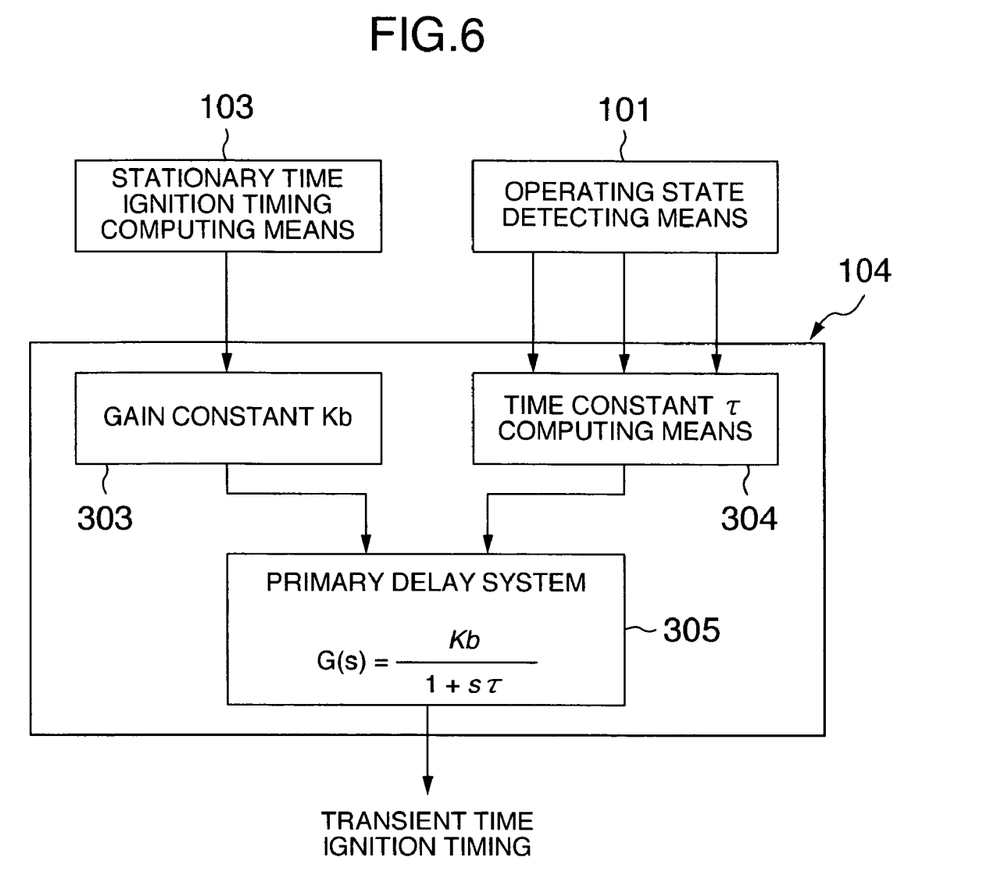
FIG. 6 is a block diagram in detail showing an embodiment of a transient time ignition timing correcting means on the basis of a primary delay system element.

FIG. 6 shows an embodiment in which the transient time ignition timing correcting means 104 of the ignition timing control apparatus 55 shown in FIG. 2 is structured as a correcting means for executing the transient correction on the basis of the primary delay system element.

The transient time ignition timing correcting means 104 has a gain setting device 303, a time constant computing means 304 and a primary delay system transient time ignition timing computing means 305.

The gain setting device 303 inputs the stationary time ignition timing signal from the stationary time ignition timing computing means 103, and sets a gain constant Kb characterizing the transient correction of the ignition timing. The gain constant Kb may be the same value as the gain constant Ka of the gain setting device 203 executing the ignition timing correction of the secondary delay system or may be a different value, as an optimum value.

The time constant computing means 304 computes a time constant τ characterizing the transient correction of the ignition timing on the basis of the operating state of the internal combustion engine 10 detected by the operating state detecting means 101. A relation between the time constant τ and the operating state of the internal combustion engine 10 is stored as a map or a regression model approaching the map, in the time constant computing means 304, and the time constant τ corresponding to the engine operating state is determined on the basis of the map or the regression model.

The primary delay system transient time ignition timing computing means 305 defines a transfer function G(s) based on the primary delay system element characterized by the gain constant Kb from the gain setting device 203, and the time constant τ from the time constant computing means 304 as follows.

$$G(s) = Kb/(1+s\tau)$$

The primary delay system transient time ignition timing computing means 305 applies the transient correction of the ignition timing by the transfer function G(s) based on the primary delay system element defined as mentioned above, and outputs the transient time ignition timing instruction signal.

It is possible to properly use the secondary delay system transient time ignition timing computing means 206 executing the transient correction based on the secondary delay system element mentioned above, and the primary delay system transient time ignition timing computing means 305 executing the transient correction based on the primary delay system element, in accordance with an operating parameter indicating the transient state detected by the operating state of the internal combustion engine 10 detected by the operating state detecting means 101.

For example, it is possible to precisely execute the ignition timing control of the transient time by the primary delay system element, with respect to the transient state of the external exhaust gas recirculation valve 29.

The natural frequency, the damping constant, the gain constant and the time constant characterizing the transient correction transfer function mentioned above can be previously determined in a developing stage on the basis of the numerical simulation apparatus simulating the internal combustion engine to be aimed, and the relation between the natural frequency, the damping constant, the gain constant and the time constant mentioned above, and the operating state is stored as the map or the regression model simulating the map, in the electronic control unit 50. In accordance with the numerical simulation apparatus simulating the internal combustion engine, it is possible to precisely determine the transient engine demand ignition timing while taking into consideration the influence of the exhaust gas recirculation rate, the turbulence characteristic or the like which is hard to be precisely measured directly by an actual measurement, whereby it is possible to determine the natural frequency, the damping constant, the gain constant and the time constant more properly.

In this case, in the present embodiment, the transient time correcting means 104 is executed by the primary delay system element or the primary delay system element, however, the present invention is not limited to this, but may be executed by a high-order delay system element equal to or more than a tertiary delay system element.

Figure 7:
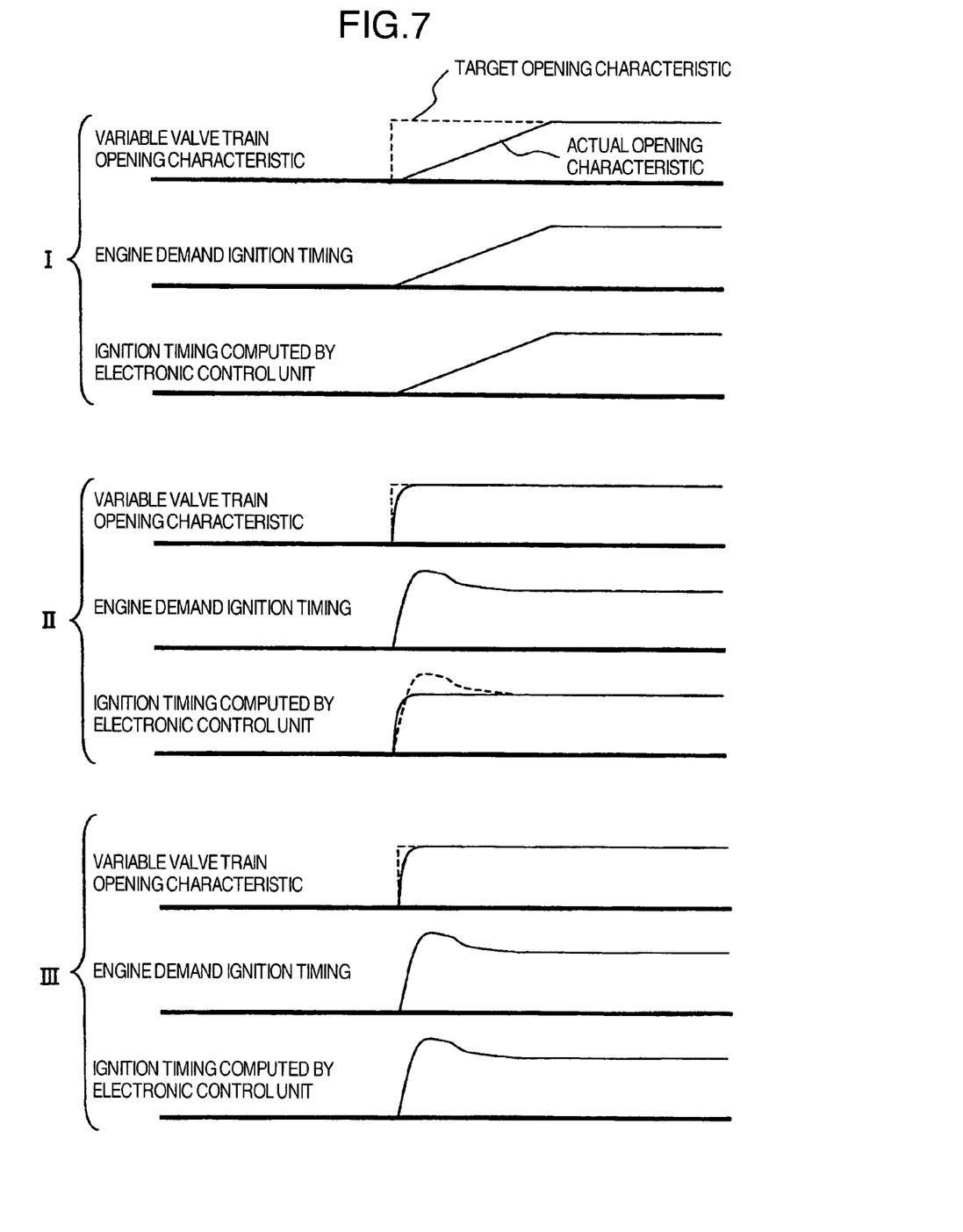
FIG. 7 is a view showing a time transition of each of a variable valve train opening characteristic at a transient time, an engine demand ignition timing (a true optimum ignition timing), and an ignition timing computed in the ignition timing control apparatus.

FIG. 7 is a view for explaining a time transition of each of the variable valve train opening characteristic at the transient time, the engine demand ignition timing (the true optimum ignition timing), the ignition timing computed in the ignition timing control apparatus 55.

A case I shows an example in the case that a response of the variable valve train is slow, and an air transport within the intake pipe is controlled so as to well follow to the response of the variable valve train.

In this case, the ignition timing can be controlled only by executing the ignition timing control in correspondence to the control amount of the variable valve train, and it is not necessary to execute the transient correction of the ignition timing described in FIG. 5 or 6.

A case II shows an example in the case that the response of the variable valve train is sufficiently fast, and the air transport within the intake pipe can not follow to the response of the variable valve train, and in the case that the transient correction of the ignition timing described in FIG. 5 or 6 is not executed.

The engine demand ignition timing takes on a vibrating behavior by the transient influence of the filling rate of the intake air, the turbulence characteristic and the exhaust gas recirculation rate, caused by the air within the intake pipe having the slow response. In the case that the transient correction of the ignition timing is not executed, the ignition timing control is executed in correspondence to the control amount of the variable valve train. Accordingly, it is impossible to well trace the engine demand ignition timing.

A case III shows an example in the case that the response of the variable valve train is sufficiently fast, and the air transport within the intake pipe can not follow to the response of the variable valve train, and in the case that the transient correction based on the secondary delay system element of the ignition timing described in FIG. 5 is executed.

The engine demand ignition timing takes on a vibrating behavior, however, in the case of executing the transient correction of the ignition timing, the transient influence of the filling rate of the intake air, the turbulence characteristic and the exhaust gas recirculation rate are expressed by the transient correction based on the secondary delay system element. Accordingly, it is possible to well trace the engine demand ignition timing.

Further, it is possible to discriminate whether or not the structure executes the transient correction of the ignition timing, by viewing the input and output relation of the electronic control unit 50 about the difference between the case II and the case III.

The description is given of the ignition timing transient correction in the case that the intake variable valve train serving as the intake and exhaust flow rate control valve is in the transient state with reference to FIGS. 4 to 7, however, the present invention is not limited to this. In other words, it is possible to execute the same ignition timing transient correction with respect to the transient state of the engine speed and the load.

Further, it is possible to execute the same ignition timing transient correction as the variable intake valve with respect to the exhaust variable valve train varying the operating characteristic of the exhaust valve 22, the external exhaust gas recirculation valve recirculating the burned gas to the intake pipe from the exhaust pipe, and the variable intake length varying the length of the intake flow path 11, as the intake and exhaust flow rate control valve, and with respect to the swirl control valve or the tumble control valve capable of forming the swirl flow or the tumble flow in the flow within the combustion chamber 23 by shielding a part or an entire of the intake passage, as the intake flow control valve.

Further, the present embodiment is structured such that the ignition signal is output from the electronic control unit 50 at the ignition timing determined by FIG. 2, however, is not limited to this. In other words, there is a case that the torque is controlled by executing a phase lag control or a spark advance control of the ignition timing in some external demand torque. At this time, the structure may be made such that an additional ignition correction is executed at the ignition timing determined by FIG. 2. Even in this case, since the external demand torque can be precisely achieved by executing the present invention which can precisely compute the engine demand ignition timing as the basic ignition timing, it is possible to execute the preferable torque control.

The effects of the ignition timing control apparatus of the internal combustion engine in accordance with the present invention will be summarized as follows.

(1) Since the ignition timing at the stationary time is computed on the basis of the detected operating state, and the ignition timing at the stationary time is corrected by the transient time ignition timing correcting means defined by the transfer function, it is possible to precisely control the ignition timing even at the transient time of the internal combustion engine.

(2) The transient correction of the ignition timing is executed on the basis of the ignition timing transient correcting means defined by the transfer function, only at a time when the time change of any one of the engine speed, the load and the operating characteristic of the intake and exhaust flow rate control means or the intake flow control means of the internal combustion engine is equal to or more than the predetermined value, only the computation of the stationary time ignition timing is executed in the case that the stationary state is determined, so that it is possible to lighten the computing load.

(3) The transfer function executing the transient correction is based on the secondary delay system element provided with any one of the natural frequency, the damping constant and the gain, and it is possible to execute the transient control of the ignition timing expressing the overshoot. Further, since the natural frequency, the damping constant and the gain are determined on the basis of any one of the engine speed, the load and the operating characteristic of the intake and exhaust flow rate control valve or the intake flow control valve, it is possible to execute the transient control of the ignition timing in correspondence to the engine speed, the load or the operating characteristic of the intake and exhaust flow rate control valve or the intake flow control valve.

(4) The transfer function executing the transient correction is based on the primary delay system element provided with any one of the time constant and the gain, and it is possible to lighten the computing load in comparison with the ignition timing transient control on the basis of the secondary delay system element. Further, since the time constant and the gain are determined on the basis of any one of the engine speed, the load and the operating characteristic of the intake and exhaust flow rate control valve or the intake flow control valve, it is possible to execute the transient control of the ignition timing in correspondence to the engine speed, the load or the operating characteristic of the intake and exhaust flow rate control valve or the intake flow control valve.

(5) Since the natural frequency, the damping constant, the gain constant and the time constant can be determined on the basis of the numerical simulation apparatus simulating the internal combustion engine, it is possible to precisely determine the transient engine demand ignition timing while taking into consideration the influence such as the exhaust gas recirculation rate, the turbulence characteristic or the like which is hard to be precisely measured directly by the actual measurement, whereby it is possible to precisely determine the natural frequency, the damping constant, the gain constant and the time constant.

(6) Even in the case that the operating characteristic of the variable valve train which can optionally change the opening characteristic of the intake or exhaust valve is under the transient state, it is possible to precisely execute the transient correction of the ignition timing.

(7) Even in the case that the operating characteristic of the external exhaust gas recirculation valve provided in the passage recirculating the burned gas to the intake pipe from the exhaust pipe is under the transient state, it is possible to precisely execute the transient correction of the ignition timing.

(8) Even in the case that the variable intake pipe length capable of changing the length of the intake passage is under the switched time, it is possible to precisely execute the transient correction of the ignition timing.

(9) Even in the case that the opening characteristic of the swirl control valve or the tumble control valve capable of forming the swirl flow or the tumble flow in the flow within the combustion chamber by shielding a part or an entire of the intake passage is under the transient state, it is possible to precisely execute the transient correction of the ignition timing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An ignition timing control apparatus of an internal combustion engine comprising:

an operating state detecting means for detecting an operating state of the internal combustion engine;

a stationary time ignition timing computing means for computing an ignition timing at a stationary time on the basis of an operating state detected by said operating state detecting means; and a transient time ignition timing correcting means for computing a transient time ignition timing by applying a transient correction defined by a transfer function on the basis of the operating state detected by said operating state detecting means to the stationary time ignition timing computed by said stationary time ignition timing computing means;

wherein said transfer function is defined by a function on the basis of a secondary delay system element, the transfer function on the basis of the secondary delay system element is provided with any one of a natural frequency, a damping constant and a gain constant, and said operating state detecting means is provided with a means for detecting at least one of an engine speed, a load and an operating characteristic of the intake and exhaust flow rate control means or the intake flow control means of the internal combustion engine, and has a means for determining said natural frequency, the damping constant and the gain constant on the basis of any one of the engine speed, the load and the operating characteristic of the intake and exhaust flow rate control means or the intake flow control means detected by said operating state detecting means.

2. An ignition timing control apparatus of an internal combustion engine as claimed in claim 1, wherein the ignition control apparatus executes the transient correction of the ignition timing by said transient time ignition timing correcting means defined by said transfer function, at a time when a time change amount of an engine speed, a load or an operating characteristic of any one of the intake and exhaust flow rate control means and the intake flow control means of the internal combustion engine is equal to or more than a predetermined value.

3. An ignition timing control apparatus of an internal combustion engine as claimed in claim 1, wherein said natural frequency, the damping constant and the gain constant are determined on the basis of a numerical simulation apparatus simulating the internal combustion engine.

4. An ignition timing control apparatus of an internal combustion engine as claimed in claim 1, wherein said transfer function is defined by a function on the basis of a primary delay system element, a transfer function on the basis of the primary delay system element is provided with any one of a time constant and a gain constant, and said operating state detecting means is provided with a means for detecting at least one of an engine speed, a load, and an operating characteristic of the intake and exhaust flow rate control means of the intake flow control means of the internal combustion engine, and has a means for determining said time constant and the gain constant on the basis of any one of the engine speed, the load, and the operating characteristic of the intake and exhaust flow rate control means or the intake flow control means detected by said operating state detecting means.

5. An ignition timing control apparatus of an internal combustion engine as claimed in claim 4, wherein said time constant and the gain constant are determined on the basis of a numerical simulation apparatus simulating said internal combustion engine.

6. An ignition timing control apparatus of an internal combustion engine as claimed in claim 1, wherein said intake and exhaust flow rate control means is constituted by a variable valve train capable of optionally changing an opening characteristic of an intake or exhaust valve.

7. An ignition timing control apparatus of an internal combustion engine as claimed in claim 1, wherein said intake and exhaust flow rate control means is constituted by an external exhaust gas recirculation valve provided in a passage recirculating a burned gas from an exhaust pipe to an intake pipe.

8. An ignition timing control apparatus of an internal combustion engine as claimed in claim 1, wherein said intake and exhaust flow rate control means is constituted by a variable intake pipe length capable of changing a length of an intake passage.

9. An ignition timing control apparatus of an internal combustion engine as claimed in claim 1, wherein said intake flow control means is constituted by a swirl control valve or a tumble control valve capable of shielding a part or an entire of an intake passage.

10. An ignition timing control method of an internal combustion engine comprising the steps of:
   computing an ignition timing at a stationary time on the basis of an operating state detected by an operating state detecting means detecting the operating state of the internal combustion engine; and
   computing a transient time ignition timing by applying a transient correction defined by a transfer function to the ignition timing at the stationary time;
   wherein said transfer function is defined by a function on the basis of a secondary delay system element, the transfer function on the basis of the secondary delay system element is provided with any one of a natural frequency, a damping constant and a gain constant, and said operating state detecting means is provided with a means for detecting at least one of an engine speed, a load and an operating characteristic of intake and exhaust flow rate control means or intake flow control means of the internal combustion engine, and has a means for determining said natural frequency, the damping constant and the gain constant on the basis of any one of the engine speed, the load and the operating characteristic of the intake and exhaust flow rate control means or the intake flow control means detected by said operating state detecting means.

\* \* \* \* \*